W. G. Hull.
Harness Saddle.
N°. 88,961.          Patented Apr. 13, 1869.
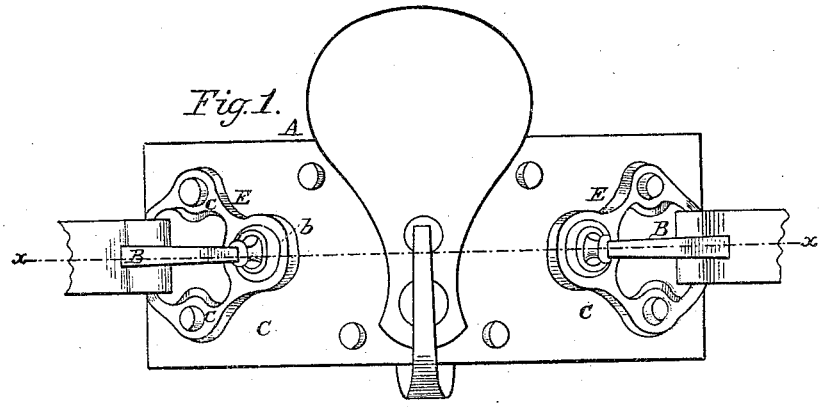
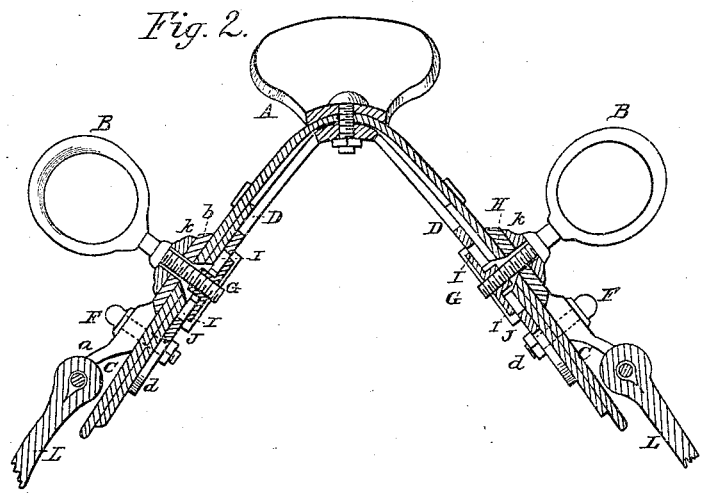
Witnesses.
Inventor:
W. G. Hull

WILLIAM G. HULL, OF SING SING, NEW YORK.

Letters Patent No. 88,961, dated April 13, 1869.

---

IMPROVED HARNESS-SADDLE.

---

The Schedule referred to in these Letters Patent and making part of the same.

---

*To all whom it may concern:*

Be it known that I, WILLIAM G. HULL, of Sing Sing, in the county of Westchester, State of New York, have invented a new and improved Harness-Saddle; and I do hereby declare the following to be a full, clear, and exact description thereof, which will enable those skilled in the art to make and use the same, reference being had to the accompanying drawing, forming part of this specification, in which drawing—

Figure 1 is a plan of a harness-saddle containing my improvement.

Figure 2 is a vertical section in the plane of the line x-x.

Similar letters indicate corresponding parts.

This invention relates to harness-saddles, and consists in an improved method of constructing the same, the usual "jockey" being dispensed with, a backband and loop being substituted therefor, in such a manner as to improve and simplify the construction of the saddle, and lessen its cost.

The letter A designates a saddle of the style called "express-saddle;"

The letter B designates the terrets, which I combine with my improvement in the manner hereinafter described; and C designates the saddle-flaps, beneath which, according to the usual construction, the usual "jockey" is placed.

The letter D designates the frame of the saddle-tree, the same being here shown without the usual padding, or cushions, which, when in a finished condition, line it on its inner surface.

Upon the sides of the saddle I place strong loops, E, which, in this example, are made of metal, the bows a of the loops, to which the backbands are attached, projecting above, or clear from the surface of the saddle, while the heads b and arms c of the loops, lie flat upon the saddle, and receive the fastening-devices.

These fastening-devices consist of the terrets B, and also of the screws F, the latter going through the arms c of the loops, and being secured, on the under side of the saddle-frame, by nuts d.

The shanks of the terrets have screw-threads formed on them, and said shanks are passed through the loop-heads b, and through the saddle-flaps, and into locking-nuts G, which are received in openings H, made in the parts of the saddle-frame beneath the frame of the loop-heads b, as is shown in the drawing, said nuts G having elongated flanges I on opposite sides, which are received between ledges J J, formed on the inner surface of the saddle-frame, in such a manner as to hold the nuts G in place, and prevent them from turning, while the terret-shanks are being screwed into them.

The terrets have washers K about their shanks, which rest on the saddle-flaps, and give steadiness to the terrets, and give them a finished appearance.

From the bows of the loops E, I suspend the backbands L, by means of which connections are made with the thills or shafts of a vehicle, or with other parts, which are to be hung upon or connected to the saddle.

I sometimes, also, modify the construction of the loop, by attaching a link upon and around the bow a, and then attaching the backband to the link.

My invention simplifies the construction of the saddle, and lessens its cost, and improves it in several particulars, one of which is that the backband and its appurtenances are exposed to view, and are upon the outside of the saddle, and outside of the saddle-flap, where they can be easily manipulated, whereas, the "jockey" appliance is beneath the flaps, which must be raised in order to reach the jockey.

Another advantage is, that by means of my loop for supporting the backband, I not only secure the terret easily and simply, but use the terret for the purpose of securing the backband and loop to the saddle-frame.

Having thus described my invention,

What I claim as new, and desire to secure by Letters Patent, is—

The loop E, constructed and arranged upon a harness-saddle in conjunction with the terret B, substantially as described.

This specification signed by me, this 12th day of February, 1869.

W. G. HULL.

Witnesses:
 W. HAUFF,
 ERNEST F. KASTENHUBER.